United States Patent
Robinson

(10) Patent No.: US 6,176,255 B1
(45) Date of Patent: Jan. 23, 2001

(54) KEYED THEFT RESISTANT VALVE CAP

(76) Inventor: Robert R. Robinson, 317 Ginger Ct., San Ramon, CA (US)

(*) Notice: Under 35 U.S.C. 154(b), the term of this patent shall be extended for 0 days.

(21) Appl. No.: 09/450,868

(22) Filed: Nov. 29, 1999

(51) Int. Cl.$^7$ ................................................ F16L 35/00
(52) U.S. Cl. ........................... 137/377; 137/327; 137/328
(58) Field of Search ................................... 137/377, 327, 137/328

(56) References Cited

U.S. PATENT DOCUMENTS

| | | |
|---|---|---|
| D. 86,154 | 2/1932 | Broecker . |
| D. 216,353 | 12/1969 | Nelson ................................. D90/20 |
| D. 255,540 | 6/1980 | Baylis .................................. D8/331 |
| D. 306,420 | 3/1990 | Robinson ............................ D12/153 |
| 531,701 | 1/1895 | Smith . |
| 596,220 | 12/1897 | Smith . |
| 764,131 | 7/1904 | Keller . |
| 1,460,250 | 6/1923 | Kraft . |
| 1,486,448 | 3/1924 | Norlund . |
| 1,491,485 | 4/1924 | McKenzie . |
| 1,550,566 | 8/1925 | Oakes . |
| 1,575,280 | 3/1926 | Reynolds . |
| 1,610,453 | 12/1926 | Kraft . |
| 1,620,887 | 3/1927 | Hansen . |
| 1,944,951 | 1/1934 | Ross . |
| 1,998,050 | 4/1935 | Gasdorf . |
| 2,179,045 | 11/1939 | Lewis . |
| 2,453,001 | 11/1948 | Stefano . |
| 2,633,176 | 3/1953 | Fears . |
| 2,774,385 | 12/1956 | Rabaseda . |
| 3,152,818 | 10/1964 | Ivins . |
| 3,923,183 | 12/1975 | Choksi et al. ........................ 215/251 |
| 4,166,552 | 9/1979 | Faulstich ............................. 215/256 |
| 4,540,322 | 9/1985 | Coffia ................................. 411/338 |
| 4,544,054 | 10/1985 | Brown ................................... 192/58 |
| 4,645,422 | 2/1987 | Brushaber ............................ 416/93 |
| 4,688,703 | 8/1987 | Bayer ................................. 222/541 |
| 4,732,289 | 3/1988 | Granat et al. ....................... 215/252 |
| 4,762,144 | * 8/1988 | Ford ................................. 137/382.5 |
| 4,869,633 | 9/1989 | Hayashi .............................. 411/368 |
| 5,325,981 | 7/1994 | Klomhaus et al. .................. 220/212 |
| 5,464,114 | * 11/1995 | Green ................................. 220/284 |
| 5,597,010 | * 1/1997 | Hoffman et al. ..................... 137/381 |
| 5,630,687 | 5/1997 | Robinson ............................. 411/372 |
| 5,638,857 | * 6/1997 | Alcumbrack ........................ 137/377 |
| 5,642,825 | 7/1997 | Wohlgemuth ....................... 215/256 |
| 5,791,371 | * 8/1998 | Kemp, II ............................. 137/383 |
| 5,819,969 | 10/1998 | Kalodye .............................. 215/251 |

FOREIGN PATENT DOCUMENTS 170803   11/1921   (FR) .

* cited by examiner

Primary Examiner—A. Michael Chambers
Assistant Examiner—Thomas L. McShane
(74) Attorney, Agent, or Firm—Kenneth C. Brooks

(57) ABSTRACT

A theft resistant valve cap including a liner adapted for threaded engagement with a standard pneumatic tire stem valve, a sleeve rotatably mounted with the liner to shroud it and an interlocking feature to selectively prevent axial displacement between the liner and the sleeve. The liner includes a hollow body with first and second opposed ends that features shoulders positioned proximate to one of said opposed ends. The shoulders, when employed with the sleeve rotatably mounted with the liner to shroud it, facilitates restricting removal of the cap from the valve stem to authorized individuals, only. Specifically, an interlocking mechanism extends between the liner and the sleeve and limits axial movement therebetween, while allowing rotational movement. To remove the cap from the valve stem, a key is employed which forms an interference fit with the shoulders in the liner, once exposed.

20 Claims, 9 Drawing Sheets

KEYED THEFT RESISTANT VALVE CAP

BACKGROUND OF THE INVENTION

1. Field of the Invention

The present invention pertains to the field of pneumatic valves. Specifically, the present invention pertains to an improved cap for use with a standard pneumatic tire valve.

2. Description of the Related Art

Valve caps for standard pneumatic tire valves have traditionally been employed to protect the valve stem from degrading due to corrosion caused by exposure to the environment. The traditional valve caps were typically manufactured from inexpensive polymer-based materials. As such, they were relatively inexpensive and weren't aesthetically appealing. A drawback with the traditional valve cap is that they were easily removed allowing access to the valve actuating member of the valve stem so air could be released from the tire by unauthorized persons. In recent years, designer caps have come into existence.

One such cap is described in U.S. Pat. No. Des. 306,420. The designer caps are aesthetically appealing to the average person and are much more expensive than the traditional valve caps. Typically, a single designer valve cap can cost several dollars. A major drawback with the designer caps is that they are easily removed from the valve stem. Similar to the traditional valve caps, this allows unauthorized persons to release air from the tire. More significant, however, is that easy removal raises the possibility that the cap would be stolen, due to its aesthetic appeal. This is a major factor in dissuading purchasers from investing in designer caps. To reduce the probability of unauthorized removal, tamper resistant valve caps have been developed.

U.S. Pat. No. 5,630,687 and U.S. patent application Ser. No. 09/151,186 each discloses a prior art tamper resistant valve cap that includes a liner adapted for threaded engagement with a standard pneumatic tire valve stem, a sleeve rotatably mounted with the liner to shroud it and an interlocking feature to selectively prevent axial displacement between the liner and the sleeve. The interlocking feature includes a screw threaded into an aperture in the sleeve, and an annular channel on the liner, positioned to receive the screw. The annular channel has an upper surface, a lower surface and an inner surface disposed between the upper and lower surfaces. The screw is moved so that it extends into the channel resting proximate to the upper surface, but clear of both said lower and inner surfaces. In this fashion, the liner and the sleeve are in a fixed axial position with respect to each other; however, the rotatability of the sleeve with respect to the liner is maintained, preventing removal of the liner from the stem. While these valve caps provide superior protection against unauthorized removal of the same, the interlocking feature proved difficult to use and manufacture.

What is needed, therefore, is a theft resistant valve cap which has reduced complexity and facilitates removal by authorized persons while frustrating removal by unauthorized persons.

SUMMARY OF THE INVENTION

A cap for a valve includes a liner having a hollow body with first and second opposed ends that features a shoulder positioned proximate to one of the opposed ends. The liner is adapted for threaded engagement with a standard pneumatic tire valve stem. The shoulder, when employed with a sleeve rotatably mounted with the liner to shroud it, facilitates restricting removal of the cap from the valve stem to authorized individuals, only. Specifically, an interlocking mechanism extends between the liner and the sleeve and limits axial movement therebetween, while allowing rotational movement. To remove the cap from the valve stem, a key is employed which forms an interference fit with the shoulder in the liner, once the shoulder is exposed. Without the key, the sleeve merely rotates freely about the liner, thereby frustrating attempts to remove the same. In one embodiment, the shoulder is formed from a single recess located proximate one of the opposed ends having an aperture therein. Although the recess may have any shape, it is typically annular. In another embodiment, there are a plurality of recesses, pairs of which are coaxial, i.e., in opposing relation on the liner. Additionally, the shoulder may be formed by one or more protrusions extending from the liner.

The liner and sleeve may be constructed so that the sleeve covers the entire liner, excepting the portion in which the shoulder is located. In this fashion, the recess is always exposed facilitating access with the key. Alternatively, the liner and sleeve may be constructed so that the sleeve selectively covers the recess. In this manner, the liner comprises a hollow body extending along a longitudinal axis between first and second opposed ends and has an interior surface and an exterior surface, disposed opposite to the interior surface. The first end includes an aperture and the interior surface extends from the aperture, terminating proximate to the second end and includes a plurality of threads, defining a threaded chamber surrounding the longitudinal axis. The exterior surface surrounds the threaded chamber and extends between the first and second opposed ends and includes a pair of shoulders formed from a pair of recesses positioned proximate to the first end. The sleeve is positioned coaxial with the liner and completely covers the exterior surface in a first position. The exterior surface has a channel, and the sleeve includes a detent adapted to be received by channel, limiting movement between the liner and the sleeve along the longitudinal axis. The channel has a thickness, and the detent has a width. The thickness and the width are measured along a direction parallel to the longitudinal axis. The relative sizes of the width and the thickness allow sufficient movement between the sleeve and the liner to expose the pair of recesses and, therefore, the shoulders, when placed in a second position. However, the detent and the channel form an interference fit in both the first and second positions. The detent may include a reciprocating member threadably attached to the sleeve. Alternatively, the detent may include a ridge formed into the sleeve.

These and other embodiments of the present invention, along with many of its advantages and features, are described in more detail below and shown in the attached figures.

DESCRIPTION OF THE PREFERRED EMBODIMENT(S)

Figure 1:
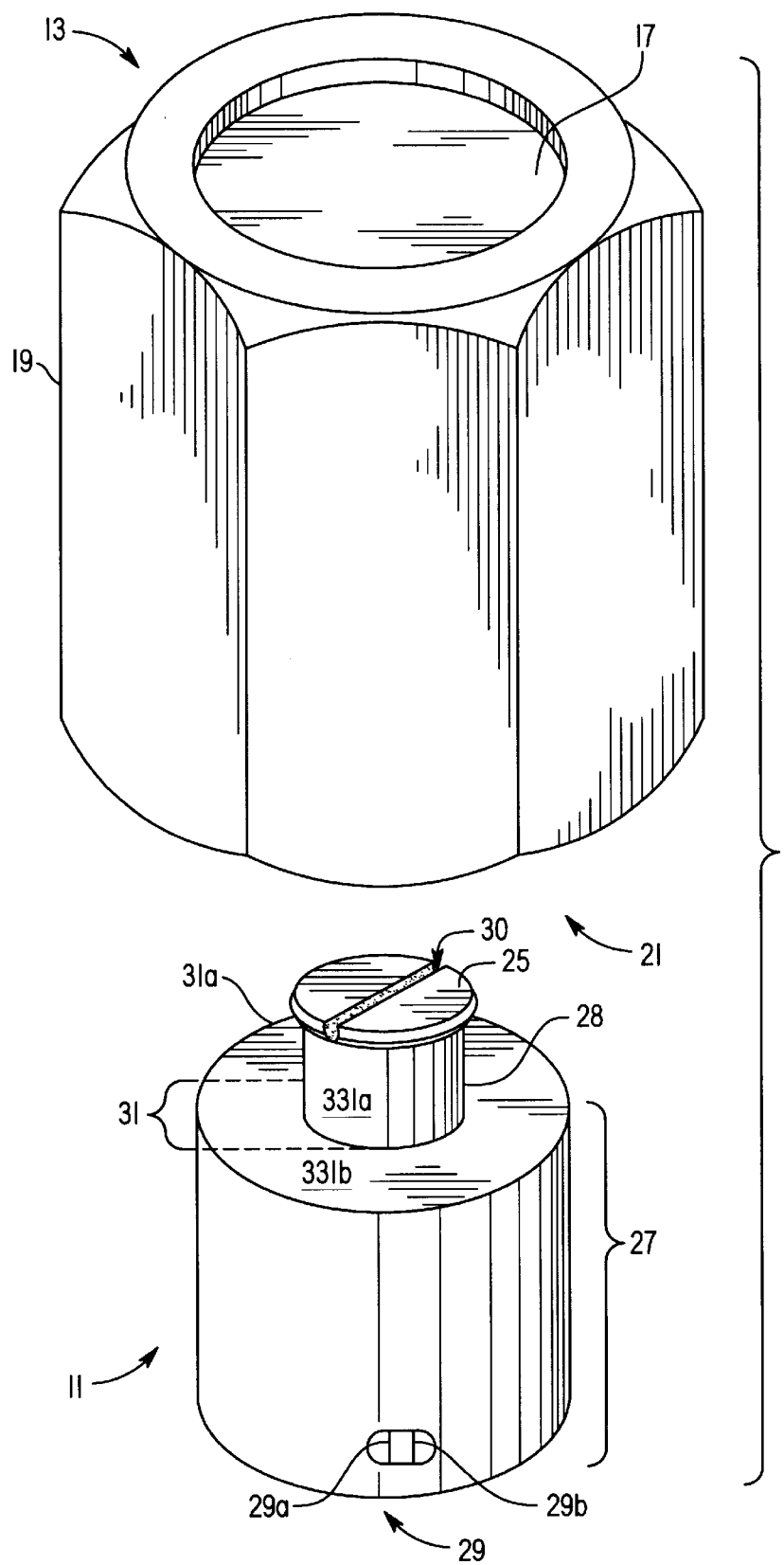
FIG. 1 shows an exploded view of a cap for a pneumatic valve in accord with the present invention.
Figure 2:
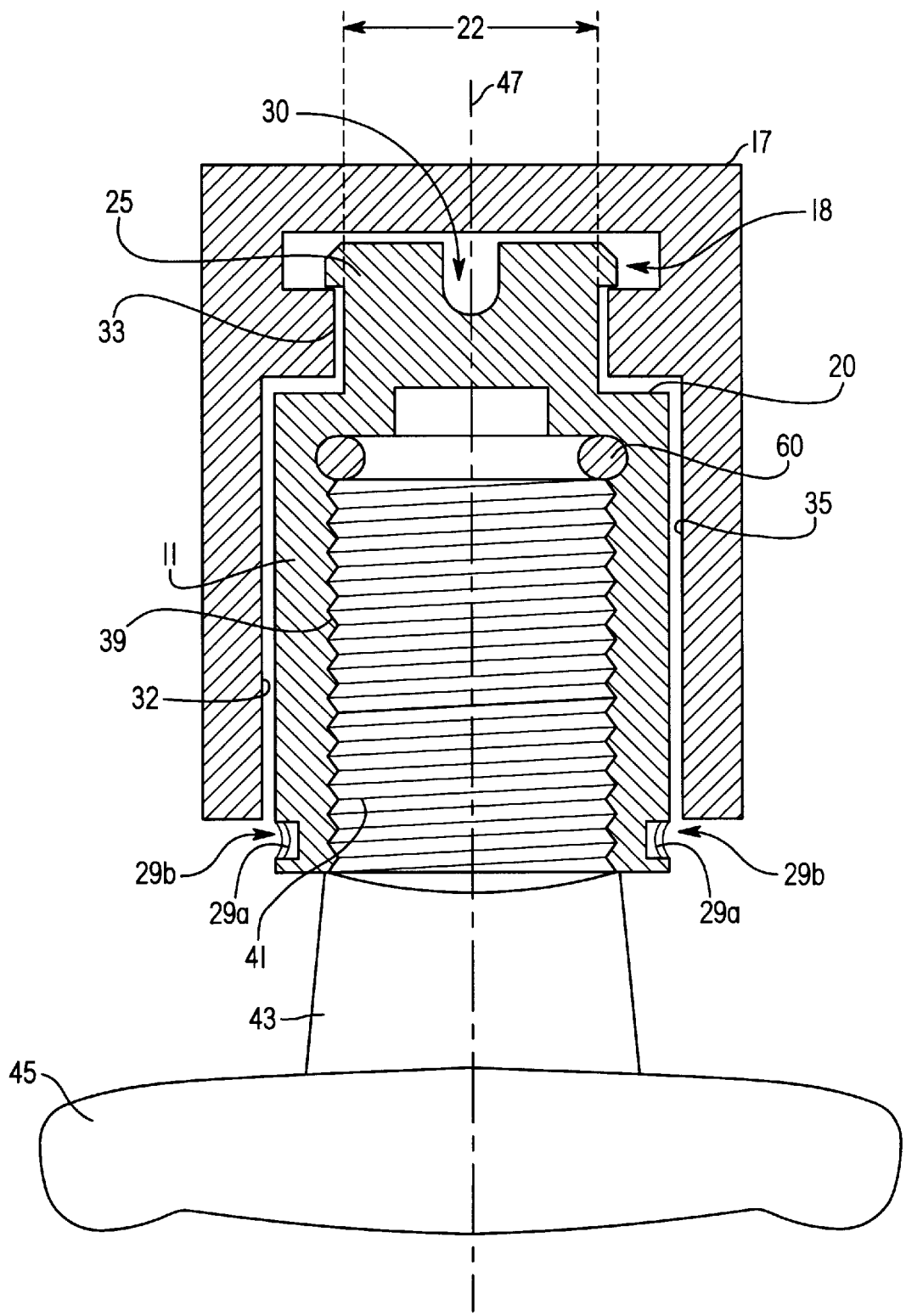
FIG. 2 is a cross-sectional view of the cap shown in of FIG. 1 mounted on a pneumatic valve stem of a standard automobile tire.

With reference to both FIGS. 1 and 2, the present invention is shown as including a hollow liner 11 and a hollow sleeve 13. The liner 11 includes an upper portion 25 and a lower portion 27. The upper portion is disc-shaped, defining a circular disc 25, and supported above the lower portion 27 by a shaft 28. The circular disc 25, lower portion 27 and the shaft 28 define an annular channel 31 having upper 31a and lower 31b surfaces, as well as an inner surface 31c extending therebetween. The lower portion 27 extends from the lower surface 31b, terminating in an orifice 29. Disposed proximate to the orifice 29 is one or more shoulders 29a. The shoulders 29a are defined by the interior surface of one or more recesses 29b formed into the lower portion 27. Optionally, one or more grooves 30 may be formed into the circular disc 25, discussed more fully below.

The sleeve 13 has a closed end 17 and a sidewall 19 and an interior surface 32. The sidewall 19 extends from the closed end 17, terminating in an opening 21. The interior surface 32 has a profile complementary to the profile of the liner 11. To that end, the interior surface 32 of the sleeve 13 includes an annular projection disposed proximate to the closed end 17, defining a bulwark 33. The bulwark 33 is spaced apart from the closed end 17, defining a cavity 35 having a varying diameter. The cavity includes two spaced-apart chambers 18 and 20 with a throughway 22 extending therebetween. The diameter of the throughway 22 is smaller than the diameter of the chambers 18 and 20. The opening 21 is shaped so that the liner 11 may pass therethrough and the circular disc 25 may be disposed within one of the chambers 18 disposed proximate to the closed end 17. Preferably, the throughway 22 has a diameter which is slightly smaller than the diameter of the circular disc 25. In this manner, the liner 11 and the sleeve 13 are in snapping-engagement upon the circular disc 25 being disposed within the chamber 18. The chamber 18 typically has a diameter slightly larger than the circular disc 25. This allows limiting the axial displacement of the sleeve 13, with respect to the liner 11, while maintaining rotational movement therebetween.

Figure 3:
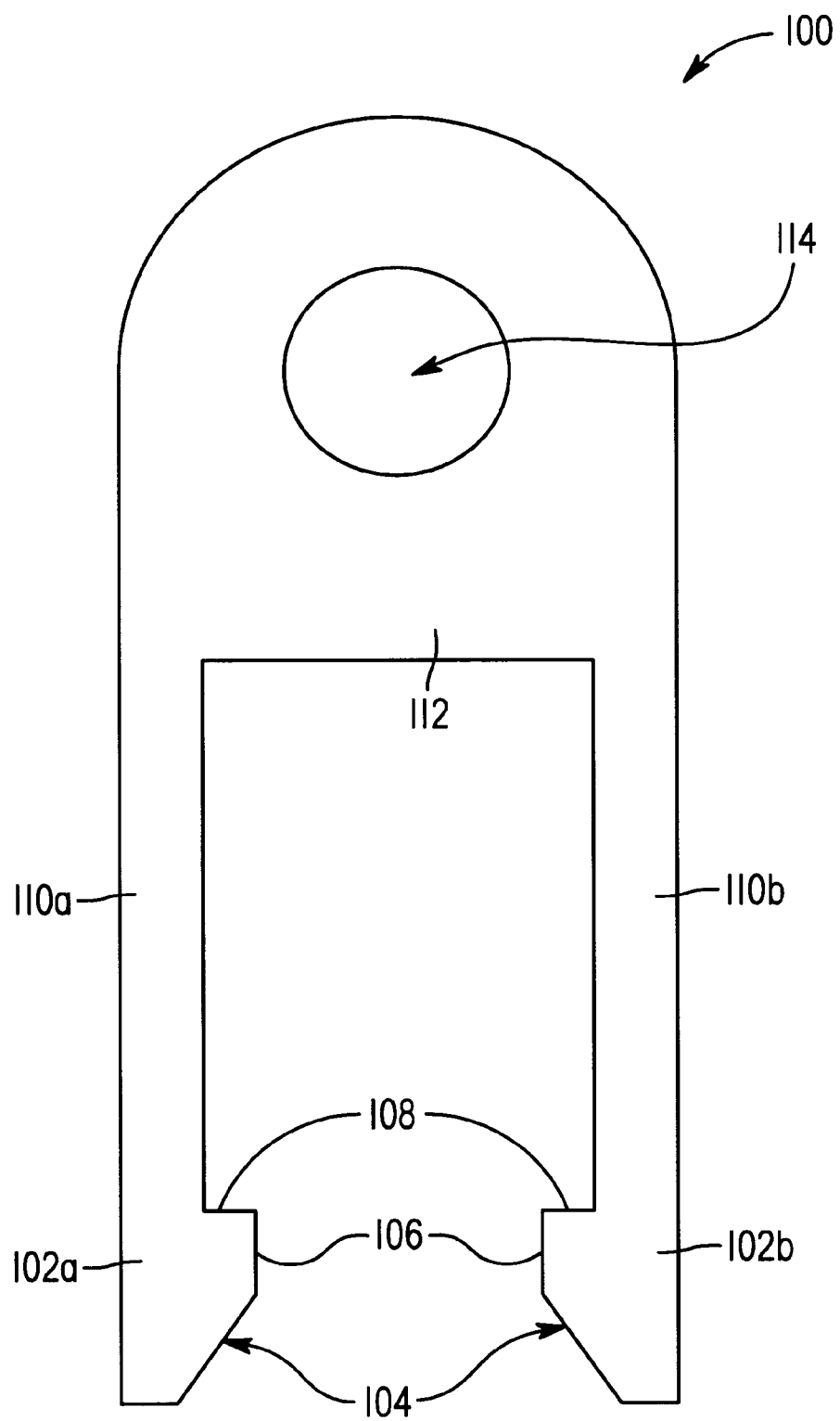
FIG. 3 is a simplified plan view of a key employed with the cap shown above in FIGS. 1 and 2, in accord with the present invention.

Referring to FIGS. 2 and 3, the closed end 17 of the sleeve 13 covers the upper portion 25 of the liner 11, and the sidewall 19 extends so as to completely cover the lower portion 27. The sidewall 19 may be longer or shorter than the lower portion 27. However, in the present embodiment, it is preferred that the sidewall 19 be shorter than the lower portion 27 to allow one or more of the recesses 29b and, therefore, the shoulders 29a, to be exposed. In this manner, a key 100 may be employed to remove the liner from the valve stem 43, discussed more fully below.

The liner 11 includes a plurality of inner threads 39 positioned to be complementary to the threads 41 of a stem 43 of a pneumatic valve for a standard automobile tire 45. In a final resting position upon the stem 43, the liner 11 provides the same advantages as a traditional valve cap. The sleeve 13 fits over the liner 11 and, with the aforementioned snapping engagement, freely rotates about axis 47. This reduces the probability of unauthorized removal from the valve stem 43. Specifically, without the key 100, the sleeve 13 provides the most likely area to be gripped to facilitate removal of the cap from the stem 43. The sleeve 13, however, will rotate freely about the axis 47, thus frustrating removal of the cap from the stem 43. To that end, the key includes at least two detents 102a and 102b, each of which has an oblique surface 104 that extends to a side region 106, terminating in a shoulder 108. The shoulder 108, extends orthogonally to the side region. A resilient member 110a and 110b extends from each of the detents 102a and 102b, respectively, terminating in a base 112. The base 112 may have an aperture therein 114 to facilitate its function as a key fob.

To remove the liner 11 and sleeve 13 from the stem 43, the key 100 is positioned over the sleeve 13 and the oblique surfaces 104 allow the detents 102a and 102b to slide easily over the sleeve 13. The resilient members 110a and 110b bow outwardly until the side region 106 is aligned with the recess 29b. Upon the side regions 106 of each of the detents 102a or 102b becoming aligned with the recess 29b, the resilient members 110a and 110b return to a rest position driving the detents 102a and 102b into the recess 29b. The key 100 is then rotated forming an interference fit between one or more of the shoulder 29a and the detents 102a and 102b. The rotational movement of the key 100 is transmitted to the liner 11, which then allows the same to be removed from the stem 43. To that end, the shoulder 29a may be defined by the opposed ends of an arcuate groove (not shown) formed integral with the liner 11. Alternatively, a plurality of circular recesses 29b may be employed to define one or more shoulders 29a. Preferably, the circular recesses 29b would be arranged in pairs with the recesses associated with the pair being disposed opposite each other.

Typically, the liner 11 is manufactured from an inexpensive and soft polymer-based compound, such as polyurethane. The liner 11 protects the stem 43 from environmental hazards and may include a rubber O-ring 60, to that end. The liner 11, however, may be manufactured from harder materials such as a compound of acrylonitrile butadiene and styrene, commonly referred to as ABS, an acetyl resin, such as the type manufactured by DuPont® under the trade name DELRIN®, or other suitable material. The groove 30 facilitates use of the harder materials, as discussed more fully in U.S. patent application Ser. No. 09/151,186 which is incorporated in reference in its entirety.

Figure 4:
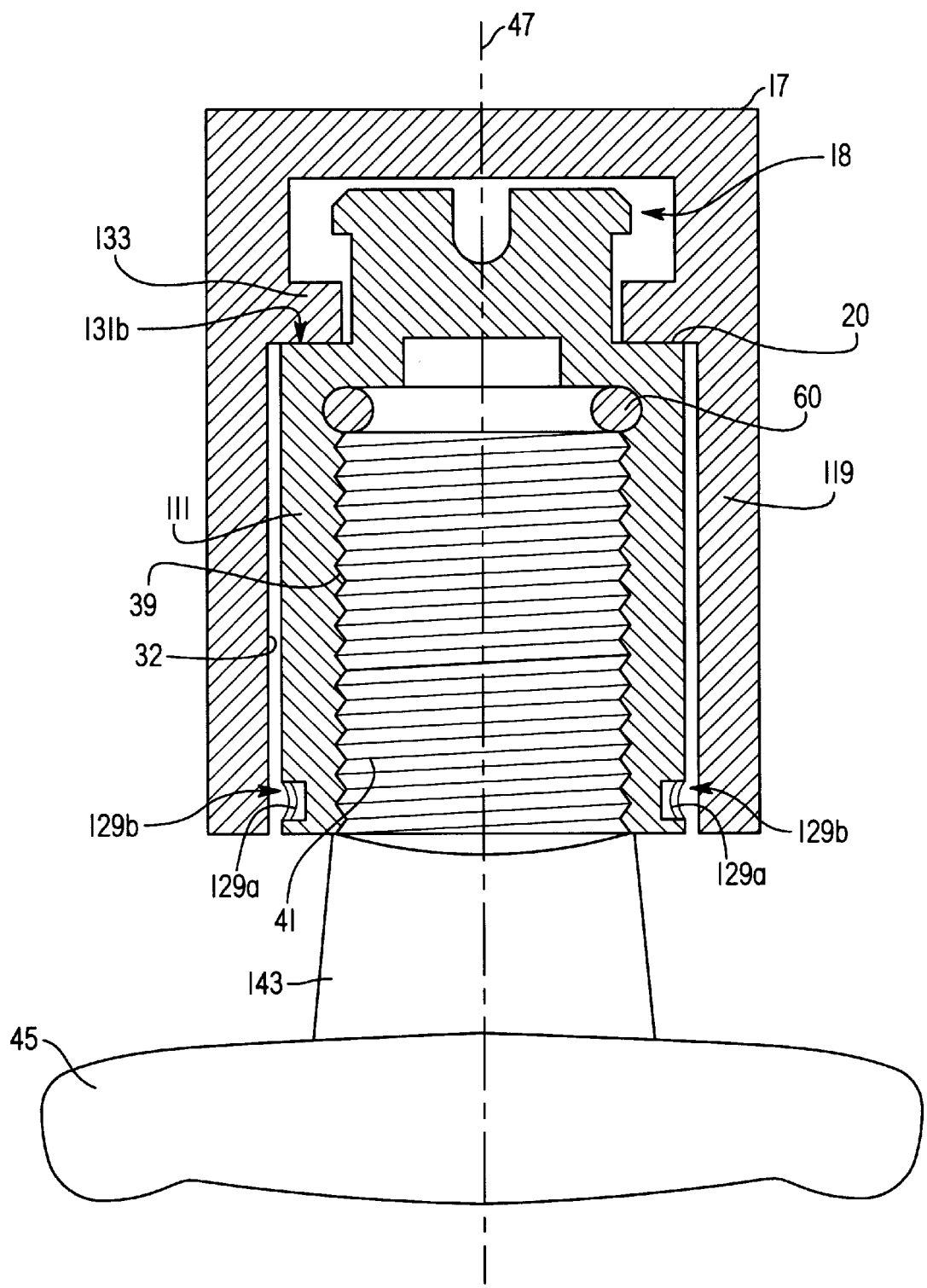
FIG. 4 is a cross-sectional view of an alternative embodiment of the cap shown in FIGS. 1 and 2 in a first position in accord with the present invention.
Figure 5:
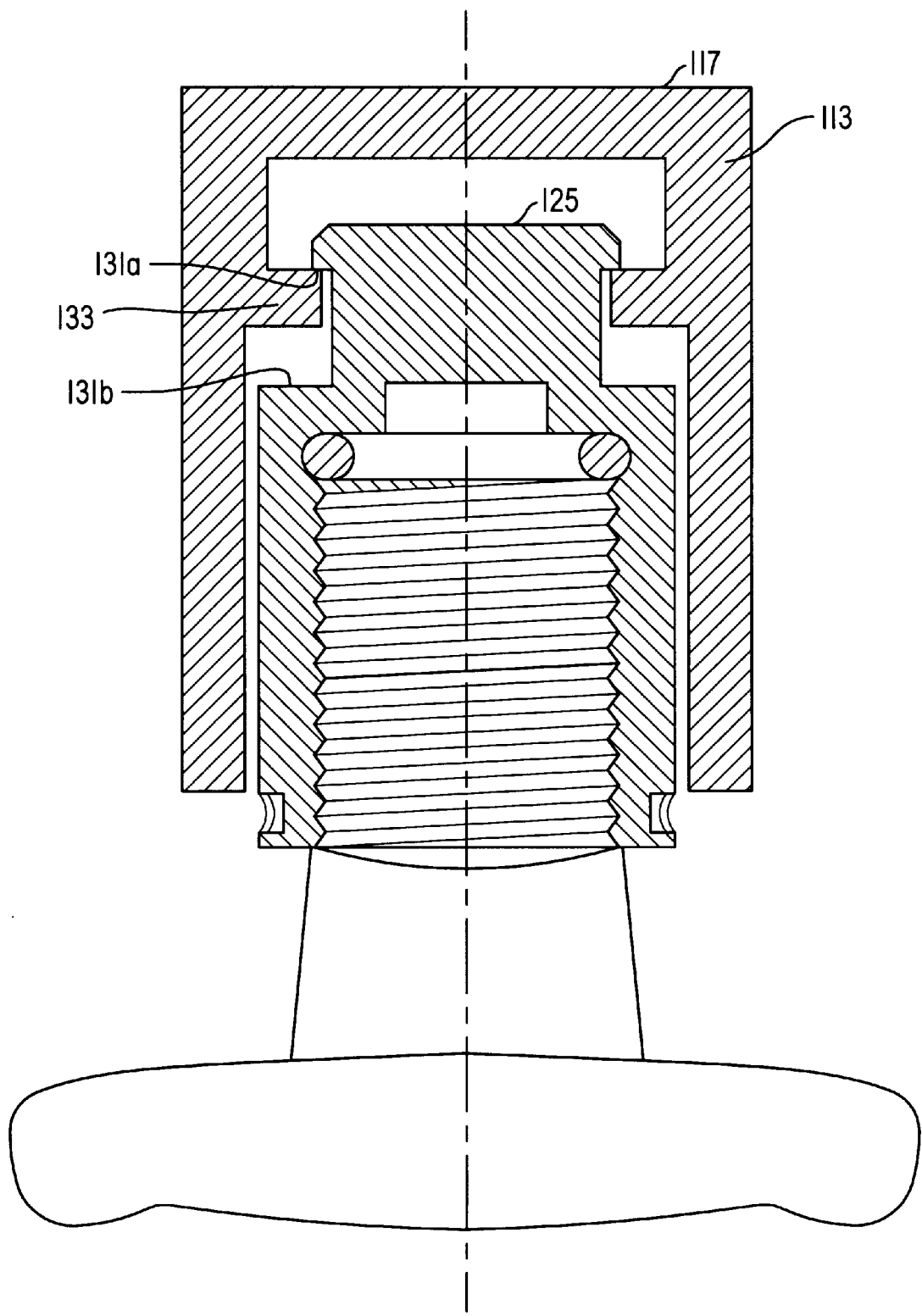
FIG. 5 is a cross-sectional view of the alternative embodiment of the cap shown in FIG. 3 in a second position to receive a key.

Referring to FIGS. 4 and 5, in another embodiment, the cap includes a sleeve 113 with a sidewall 119 that is coextensive with the lower portion 127, upon the sleeve 113 and the liner 111 reaching a final seating position. In the final seating position, the bulwark 133 rests against the lower surface 131b. In this position, referred to as a first position, the sidewall 119 covers the shoulders 129a. This provides the cap with a more aesthetically appealing configuration. Were it desired to remove the cap from the valve stem 143, the sleeve 113 is raised to a second position, shown more clearly in FIG. 5.

In the second position, the bulwark 133 is spaced-apart from the lower surface 31b and may, as shown, abut against the upper surface 31a. In this position, the closed end 117 of the sleeve 113 is spaced apart from the circular disc 125 so that the sidewall 119 is raised above the recesses 129b, thereby exposing the shoulders 129a. The key, 100, shown more clearly in FIG. 3, may be employed to remove the cap, as discussed above. In this manner, a key 100 may be employed to remove the liner from the valve stem 43, discussed more fully below.

Figure 6:
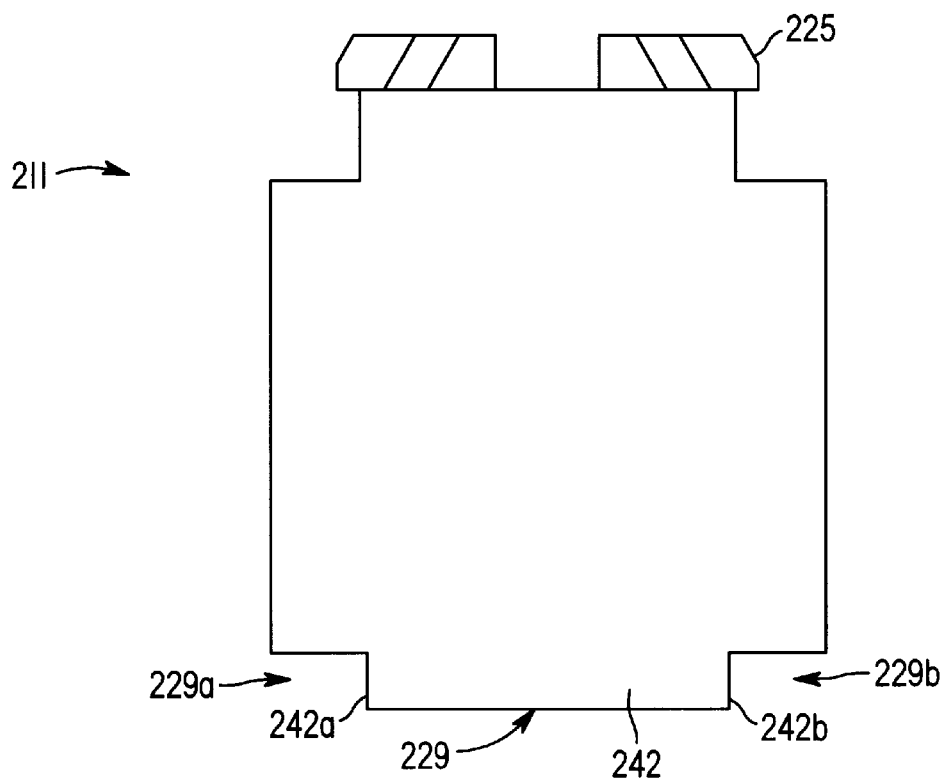
FIG. 6 is a side view of a liner in accordance with an alternate embodiment of the present invention.
Figure 7:
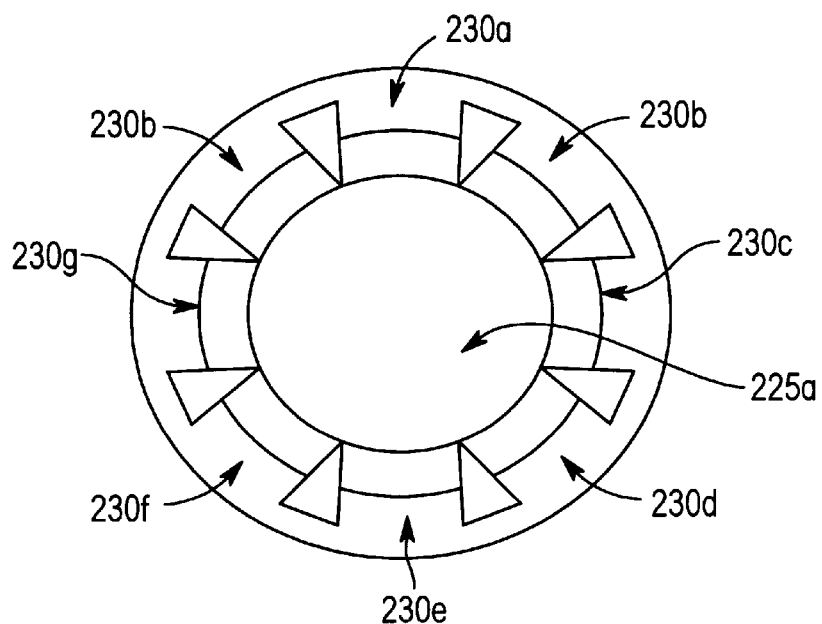
FIG. 7 is a top down view of the liner shown above in FIG. 6.
Figure 8:
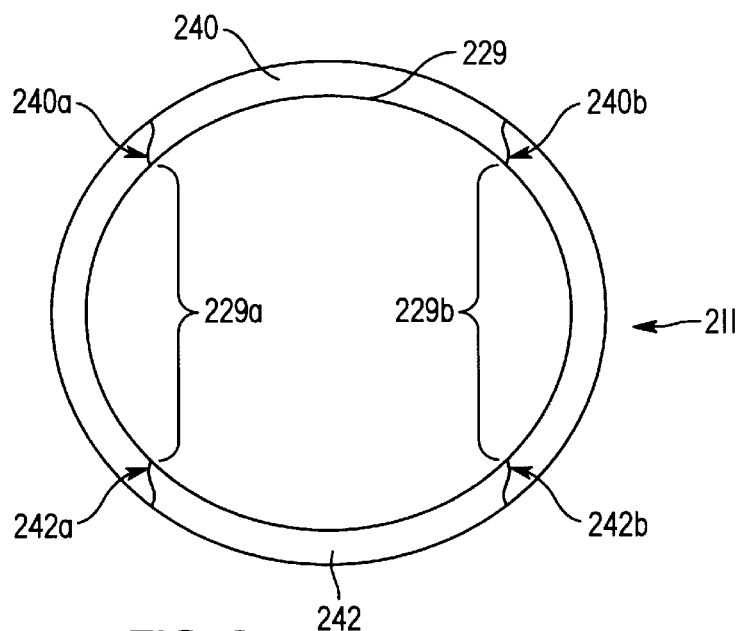
FIG. 8 is a bottom view of the liner shown above in FIGS. 6 and 7.

Referring to FIG. 6, another embodiment of the liner 211 is substantially identical to liner 11, discussed above with respect to FIGS. 1 and 2, except that a plurality of grooves are included in the circular disc 225, shown in FIGS. 6 and 7, and the protrusions 240 and 242 formed proximate to the orifice 229. Specifically, the plurality of grooves, 230a, 230b, 230c, 230d, 230e, 230f, 230g and 230h, are shown in FIG. 8 as being disposed in the circular disc 225. The aforementioned grooves intersect in a recessed middle portion 225a of the circular disc 225. Protrusions 240 and 242 are formed by removing a portion of the perimeter of the orifice 229 to define two spaced-apart shoulders. Specifically, protrusion 240 defines shoulders 240a and 240b, and protrusion 242 defines shoulders 242a and 242b.

Figure 9:
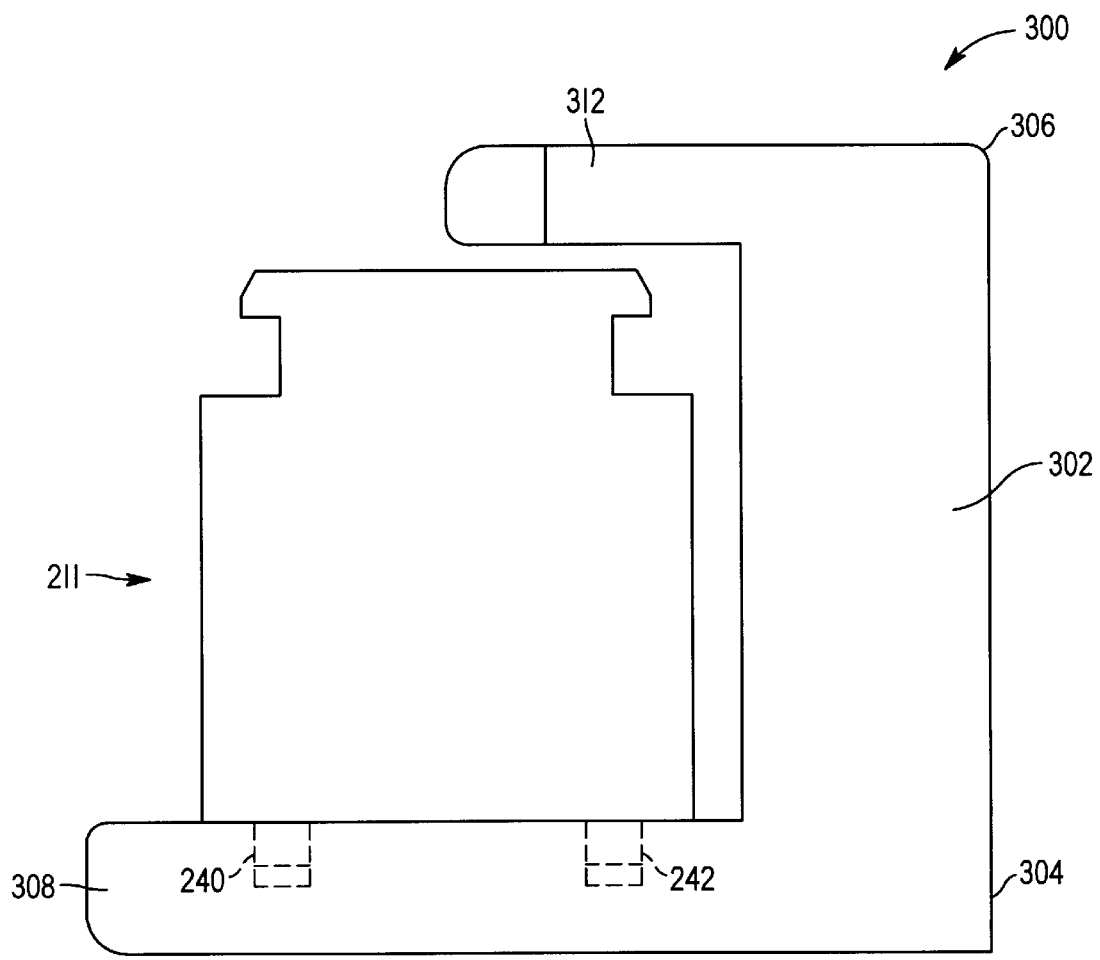
FIG. 9 is a side view of a key employed to remove the liner shown above in FIGS. 6, 7 and 8, from a pneumatic valve stem.
Figure 10:
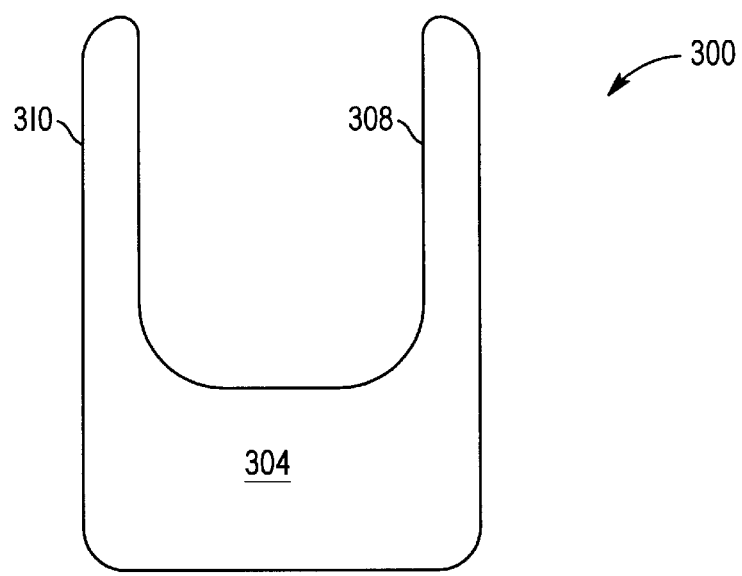
FIG. 10 is a bottom view of the key shown above in FIG. 9.

Referring to FIGS. 8, 9 and 10 with liner 211, a key would be employed 300 that includes a handle 302 having opposed ends 304 and 306 with two spaced-apart tines 308 and 310, extending from end 304. An upper extent 312 projects from end 306 so as to be disposed opposite to the spaced-apart tines 308 and 310. The handle 302 extends between the upper extent 312 and the spaced-apart tines 308 and 310 along a direction that is transverse to the direction along which the spaced-apart tines 308 and 310 and the upper extent 312 extend. Upon removal of the liner 211, the protrusions 240 and 242 are disposed between the tines 308 and 310. By rotating the key 300, each of the tines 308 and 310 form an interference fit with one of the shoulders 240a–b and 242a–b, causing the liner 211 to rotate.

Figure 11:
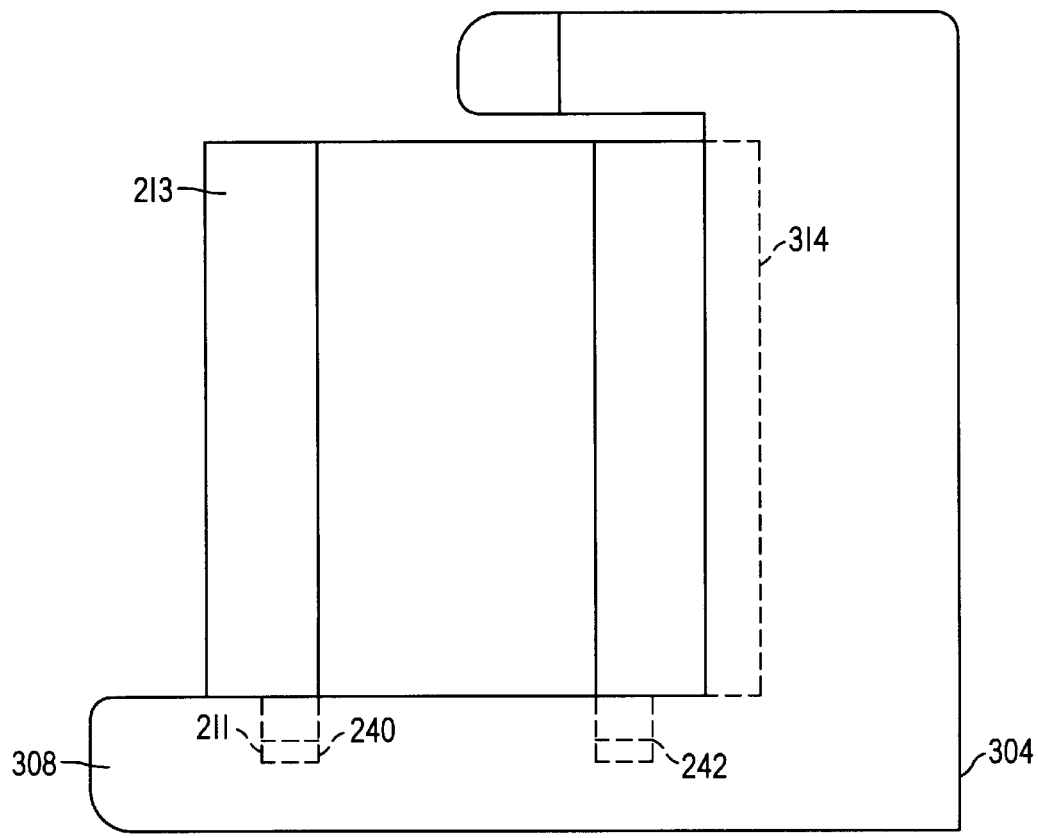
FIG. 11 is a side view of an alternate embodiment of a key employed to remove the liner shown above in FIGS. 6, 7 and 8, from a pneumatic valve stem.

Referring to FIG. 11, to facilitate positioning the key 300 on the liner 211, the handle may be formed with a recess 314 having a profile complementary to the shape of the sleeve 213 that covers the liner 211. In this fashion, a portion of the sleeve 213 fits within the recess 314 and between the upper extent 312 and the tines, one of which is shown as 308.

Figure 12:
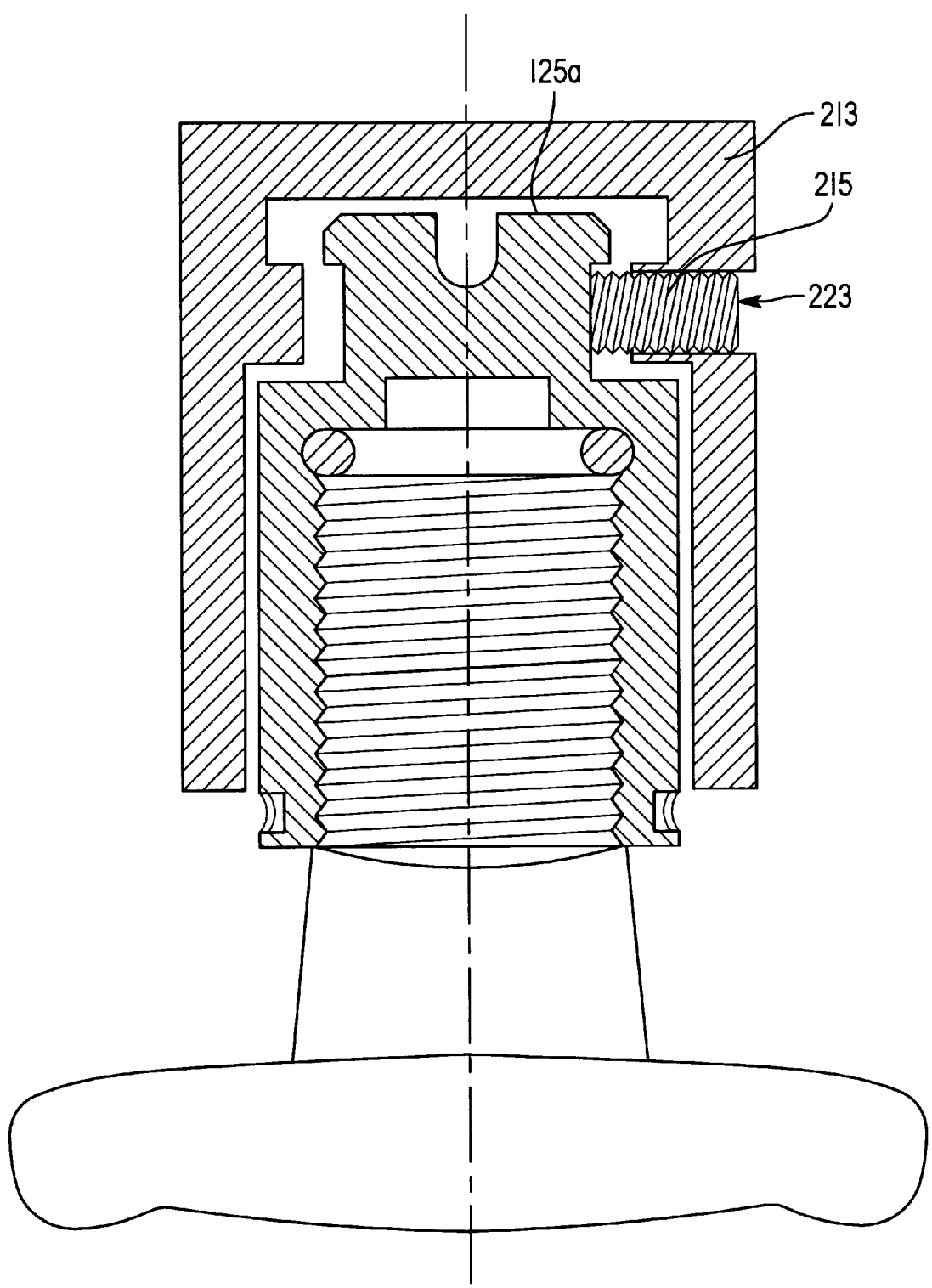
FIG. 12 is a cross-sectional view of a second alternative embodiment of the cap shown above in FIGS. 1 and 2, in accord with the present invention.

Referring to FIG. 2, although the liner has been discussed as having a groove 30 formed into the crown surface of the circular disc 25, it should be understood that the crown surface 125a may be completely planar, shown more clearly in FIG. 12. In addition, the bulwark 33, shown in FIG. 3, may be replaced as the protrusion into the annular channel 31 by a reciprocating member, such as a screw 215, shown in FIG. 12. The screw 215 is threaded into a threaded aperture 223 formed into the sleeve 213. This may be employed with the embodiment of the present invention discussed with respect to FIGS. 4 and 5, as well. This allows removal for the cap from a tire stem by employing either the aforementioned key 100 or using the screw 115, as discussed more fully in U.S. Pat. No. 5,630,687 which is incorporated in its entirety herein. Therefore, the scope of the invention should not be determined with respect to the description recited above. Rather, the scope of invention should be determined with respect the claims recited below, including the full scope of equivalents thereof.

I claim:

1. A cap for a valve comprising:
   a hollow body having first and second opposed ends, an interior surface and an exterior surface, disposed opposite to said interior surface, with said first end including an aperture and said interior surface extending from said aperture and terminating proximate to said second end and including a plurality of threads, said exterior surface extending between said first and second opposed ends, and having a shoulder formed therein, proximate to and spaced-apart from said first end.

2. The cap as recited in claim 1 wherein said body includes a plurality of shoulders disposed proximate to said first end, with two of said plurality of shoulders being disposed opposite to each other.

3. The cap as recited in claim 1 wherein said body includes a plurality of shoulders arranged in pairs, with shoulders associated with each pair being disposed opposite to one another.

4. The cap as recited in claim 1 wherein said body extends along a longitudinal axis, with said second end being closed and said exterior surface surrounding said longitudinal axis and including a channel surround said longitudinal axis.

5. The cap as recited in claim 1 further including an additional shoulder, with both said shoulder and said additional shoulder being defined by a protrusion extending from a perimeter of said first end, with said perimeter surrounding said aperture.

6. The cap as recited in claim 1 further including an additional shoulder, with both said shoulder and said additional shoulder being defined by a plurality of recesses formed proximate to said first end.

7. The cap as recited in claim 1 further including a sleeve positioned over said liner and means for selectively limiting relative movement between said liner and said sleeve along a longitudinal axis while maintaining rotational movement therebetween about said longitudinal axis.

8. The cap as recited in claim 1 wherein said second end includes a crown surface with a groove formed therein.

9. The cap as recited in claim 8 wherein said groove has an arcuate shape and said second end has a circular shape with said groove extending across the diameter of said second end.

10. A cap for a valve comprising:
    a hollow body extending along a longitudinal axis between first and second opposed ends, said body having an interior surface and an exterior surface, disposed opposite to said interior surface, with said first end including an aperture and said interior surface extending from said aperture and terminating proximate to said second end and including a plurality of threads, defining a threaded chamber surrounding said longitudinal axis, said exterior surface surrounding said threaded chamber and extending between said first and second opposed ends and including a pair of shoulder positioned proximate to said first end;
    a sleeve positioned over said liner; and
    means, coupled between said hollow body and said sleeve, for selectively limiting relative movement between said liner and said sleeve along said longitudinal axis while allowing said pair of shoulders to be exposed and maintaining rotational movement therebetween about said longitudinal axis.

11. The cap as recited in claim 10 wherein said sleeve is positioned coaxial with said liner, about said axis, and includes a closed end and a sidewall extending therefrom terminating in an opening, defining a length therebetween, with said exterior surface having a height measured parallel to said longitudinal axis, with said means for selectively limiting including establishing said height to have a greater magnitude than said length.

12. The cap as recited in claim 10 wherein said means for selectively limiting includes a channel formed into said liner and a detent extending from said sleeve adapted to be received within said channel.

13. The cap as recited in claim 12 wherein said detent includes a reciprocating member mounted to said sleeve to move transversely to said longitudinal axis.

14. The cap as recited in claim 10 wherein said detent is integrally formed with said sleeve.

15. A cap for a valve comprising:

a hollow body extending along a longitudinal axis between first and second opposed ends, said body having an interior surface and an exterior surface, disposed opposite to said interior surface, with said first end including an aperture and said interior surface extending from said aperture and terminating proximate to said second end and including a plurality of threads, defining a threaded chamber surrounding said longitudinal axis, said exterior surface surrounding said threaded chamber and extending between said first and second opposed ends and including a pair of recesses positioned proximate to said first end; and a sleeve positioned coaxial with said hollow body and completely covering said exterior surface in a first position, with said exterior surface having a recess and said sleeve including a detent adapted to receive said recess to limit movement between said hollow body and said sleeve along said longitudinal axis, with said recess having a thickness and said detent having a width, both of which are measured parallel to said longitudinal axis, with said width being sufficiently greater than said thickness to allow sufficient movement between said sleeve and said hollow body to expose said pair of recesses in a second position, with said detent and said recesses forming an interference fit in both said first and second positions.

16. The cap as recited in claim 15 wherein said hollow body further includes an additional pair of recesses, defining first and second pairs of recesses, the recesses of each pair being coaxial along a radial axis, with the radial axis associated with the first pair extending transversely to the radial axis associated with the second pair.

17. The cap as recited in claim 15 wherein said detent includes a reciprocating member threadably attached to said sleeve.

18. The cap as recited in claim 15 wherein said detent is integrally formed with said sleeve.

19. The cap as recited in claim 15 wherein said hollow body has a cylindrical shape and said sleeve includes a closed end and a sidewall extending therefrom terminating in an opening, with said side wall having an interior aside, facing said exterior surface, and a exterior side disposed opposite to said interior surface, with said interior surface having a cylindrical shape.

20. The cap as recited in claim 15 wherein said pair of recesses define a plurality of shoulders.

* * * * *